Feb. 23, 1932.                A. J. SWANSON                1,846,443
                          FRONT SEAT FOR VEHICLES
                  Original Filed Jan. 23, 1930    2 Sheets-Sheet 1
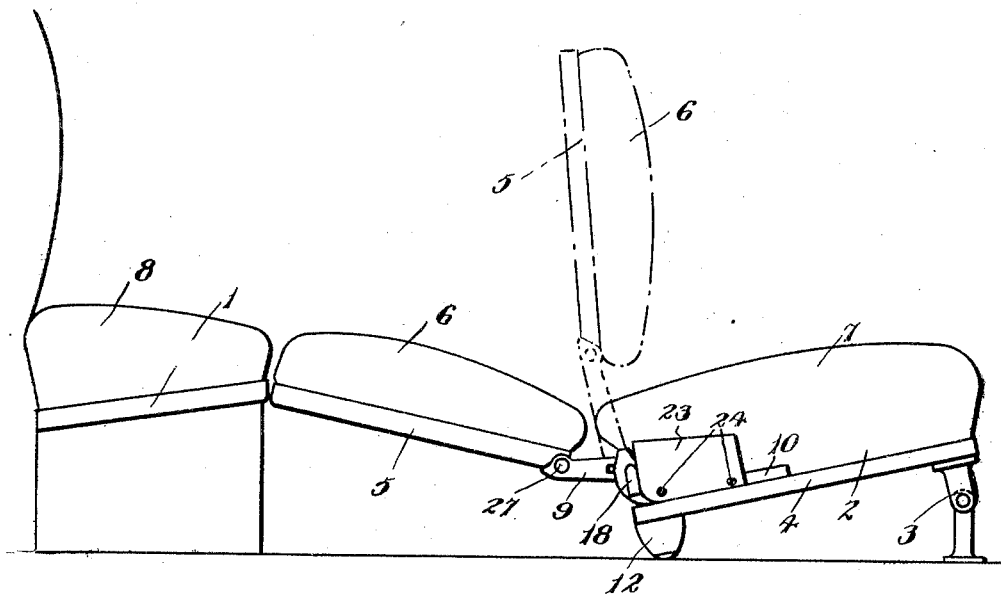
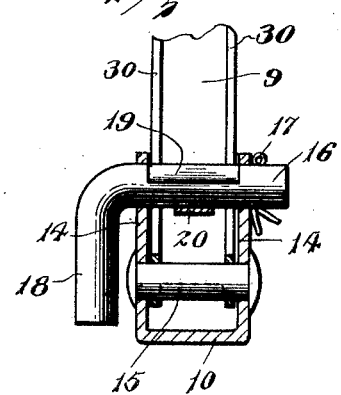
Inventor
A. J. Swanson
By Lacey & Lacey,
Attorneys

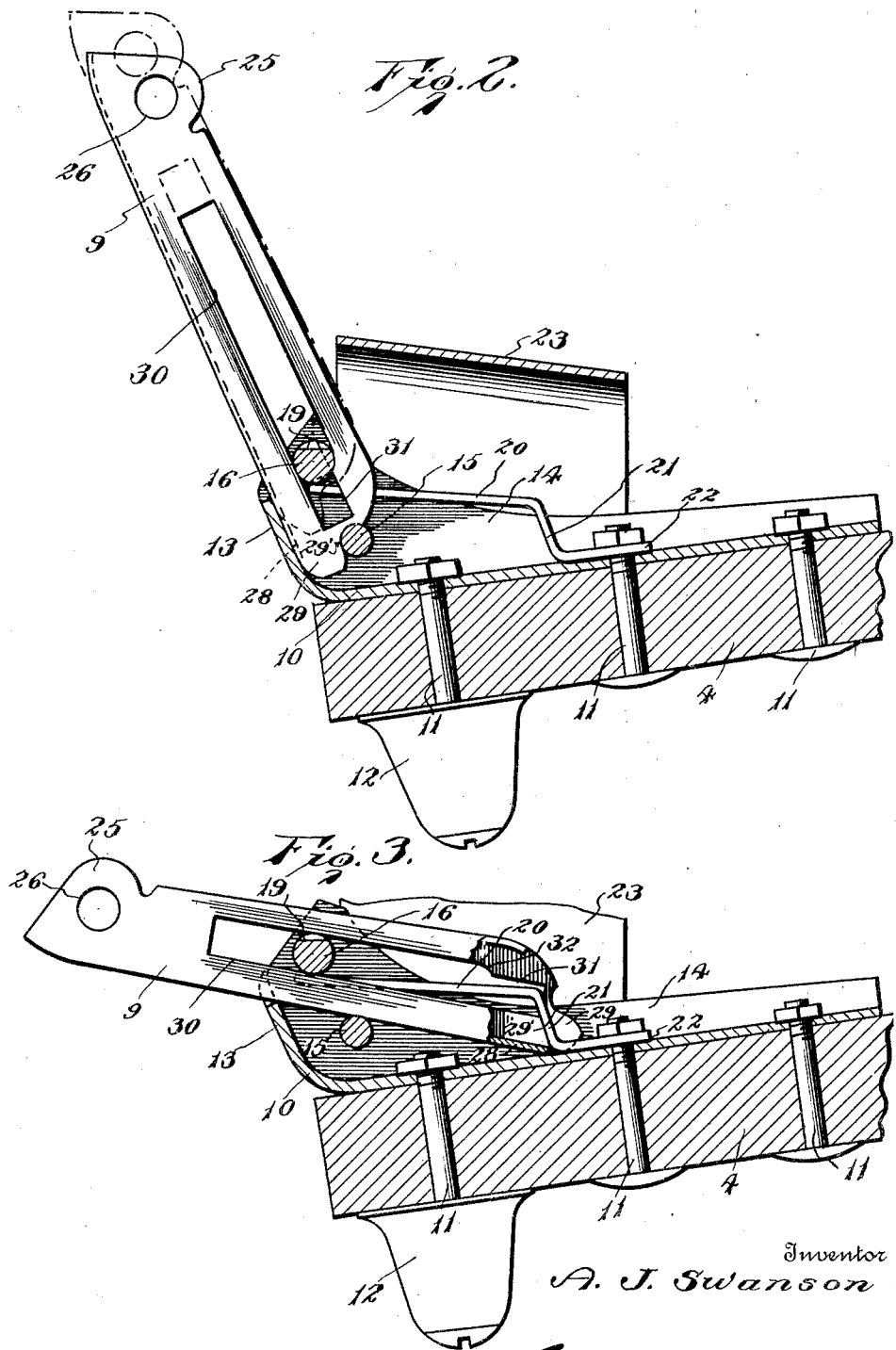

Patented Feb. 23, 1932

1,846,443

UNITED STATES PATENT OFFICE

ALBERT J. SWANSON, OF MACOMB, ILLINOIS, ASSIGNOR TO CLARA M. MEYER, OF WATERLOO, IOWA

FRONT SEAT FOR VEHICLES

Application filed January 23, 1930, Serial No. 422,856. Renewed December 30, 1931.

This invention relates to vehicles and more particularly to a front seat of an automobile. At the present time many persons travel from one place to another by automobile and since stops must be made for the night it is necessary either to stop at a town where hotel accommodations may be had or carry along a camping outfit including a tent and portable cots. If stops are made at a town, a great deal of time is lost and if tents and portable cots are carried they take up a great deal of room in an automobile or necessitate the use of a trailer and also must be set up for use at night and taken down in the morning. Some persons when making short trips sleep in an automobile rather than lose time by stopping at a town or have the trouble of taking a camping outfit for only one or two stops but this is very uncomfortable as the seats are not wide enough for reclining purposes and are also too close to each other and to the front of the car.

In order to overcome these objections, one object of the invention is to provide the front seat of the automobile with a back which may be retained in an upright position while driving and may be lowered so that it extends between the front and rear seats and constitutes a support between the two seats so that the occupant or occupants of the automobile may place blankets upon the front and rear seats and lowered back of the front seat and thereby build a bunk which will be of sufficient length and width to permit it to be comfortably occupied while sleeping.

Another object of the invention is to provide an improved type of bracket by means of which the back of the front seat is mounted and so form this bracket that the back of the seat may be securely braced in either a raised or lowered position.

Another object of the invention is to allow the back to be easily raised or lowered but at the same time prevent it from slipping when moved to an adjusted position and to so form the mounting portion of the bracket that the cushion of the front seat will be prevented from becoming caught in the bracket when adjusting the back.

Another object of the invention is to so form the bracket that it will be of a simple construction but at the same time very strong and durable.

The invention is illustrated in the accompanying drawings, wherein

Figure 1 is a side elevation showing the back of the front seat swung downwardly from a raised to a reclining or lowered position, the rest for the back being indicated by dotted lines.

Fig. 2 is an enlarged sectional view through the bracket and seat frame of the front seat with the back-engaging portion of the bracket in a raised position.

Fig. 3 is a view similar to Fig. 2 showing the back-engaging portion or arm of the bracket in a lowered position, and Fig. 4 is a fragmentary sectional view through the bracket.

In Figure 1 of the drawings, the rear and front seats of an automobile are indicated in general by the numerals 1 and 2. These seats may be stationary or the front seat may be hingedly mounted, as shown at 3, so that it may be tilted forwardly in order to permit access to the rear portion of the automobile and the front seat may extend the full width of the automobile or separate front seats may be provided. In either case, the front seat is formed with the usual seat frame 4 and back 5. The back is provided with the usual padding or upholstery, as shown at 6, and upon the seat frame 4 rests the usual cushion 7 which may be permanently secured thereto or removable. The cushion 8 of the rear seat is removable so that it may be lifted and after being turned replaced with its highest portion at the rear, as shown in Figure 1, instead of at its front. The back of the front seat is connected with the seat frame by a bracket at each side of such construction that the back may be secured in an upright position when driving or lowered so that it extends between the front and rear seats, as shown in Figure 1, and thereby bridge the space between the front and rear seats and together with the seats form a substantially continuous padded support upon which blankets may be placed and form a comfortable bunk.

The brackets by means of which the back is connected with the seat frame of the front seat are of a duplicate construction and each is constructed as shown in Figures 2, 3 and 4. This bracket consists of an arm 9 and a mounting or bracket proper 10 with which the arm is slidably and pivotally engaged. The mounting or bracket 10 is formed of strong sheet metal and is secured to the seat frame 4 by bolts 11, one of which is extended downwardly below the frame and carries the usual knob 12 which rests upon the floor of the car but is unsecured thereto so that the front seat may be tilted forwardly to permit access to the rear portion of the automobile. If the automobile is provided with both front and rear doors, the front seat will be mounted in a fixed position in which case supports of a conventional construction may be provided instead of the hinge 3 and knob 12 and the rear bolt 11 will then be similar to the other bolts instead of extending downwardly below the seat frame. The rear portion of the bracket extends upwardly to form a wall 13 which extends at an incline to the seat frame, as shown in Figures 2 and 3, and along the sides of the bracket are formed side flanges or walls 14 which increase in depth towards their rear ends. These walls are formed with alined openings disposed one above the other in front of the rear wall through which are passed a rod 15 and a pin 16, and from an inspection of Figure 4 it will be seen that the rod 15 has heads formed at its ends so that it will be prevented from slipping longitudinally out of the openings in the walls through which it passes whereas the pin 16 is rotatable in the openings in which it is mounted and has one end formed with an opening to receive a securing key 17 and its other end portion bent to form a handle 18 by means of which it may be rotated. The portion of the pin 16 between the side walls of the bracket is flattened along one side, as shown at 19, and, therefore, the diameter of this portion of the pin when taken at right angles to the flat face will be shorter than the diameter taken parallel to the flat face. A tongue 20 extends longitudinally through the bracket and has its forward portion bent downwardly, as shown at 21, and then forwardly to form a foot 22 through which one of the bolts 11 is passed so that, when the nut of this bolt is applied, the tongue will be firmly secured to the bracket. By an inspection of Figures 2 and 3, it will be seen that the rear end of the tongue extends between the rod 15 and pin 16 and terminates in spaced relation to the rear wall of the bracket. A shield 23 formed of metal and of an inverted U-shaped construction is disposed over the bracket and secured thereto by screws 24 which are passed through openings formed in the outer side portion of the shield and screwed into threaded openings formed in the outer side wall of the bracket. This shield covers the major portion of the bracket and serves very effectively to prevent the front cushion from becoming caught in the bracket and preventing easy raising and lowering of the back.

The arm 9 is of a hollow formation and at its upper end is formed with transversely spaced hinge ears 25 having openings 26 through which a bolt or an equivalent fastener 27 may be passed in order to firmly secure the upper end of the arm to the back 5 at one side thereof. The arm is open at its lower end and has its side walls extended beyond its rear wall or web 28, thereby providing ears 29 in which notches or seats 29' are formed to receive the rod 15 when the arm is in a raised position, as shown in Figure 2. Opposed slots 30 are formed in the side walls of the arm and these slots have their lower end portions 31 reduced in width and, therefore, each slot is formed with a shoulder 32 at the upper end of its reduced lower portion. The pin 16 extends through the slots of the side walls of the arm, and by referring to Figure 2 it will be seen that when the handle of the pin is swung downwardly to the position shown in Figure 1 to dispose the flat face 19 uppermost the pin will be prevented from entering the lower ends of the slots. Therefore, the arm cannot be drawn upwardly, as indicated by dotted lines in Figure 2, and since the rod 15 is engaged in the seats 29' at the lower end of the arm this arm will be firmly braced and prevented from tilting and moving out of an upright position. By swinging the handle of the pin upwardly to a horizontal position the flat face will be disposed longitudinally of the slots formed in the side walls of the arm and the pin will then be allowed to enter the reduced lower ends of the slots. Therefore, the arm may be drawn upwardly, as indicated by dotted lines in Figure 2, to such a position that the lower end of the arm is above the rod 15 and the arm can then be tilted rearwardly until the lower end of its rear wall strikes the under surface of the tongue 20, after which pressure may be exerted to slide the arm forwardly over the rod 15 until the forward end of the rear wall of the arm engages between the bottom of the bracket and rear end of the foot 22. The back of the front seat will then be in the lowered position shown in Figure 1 and since the front end of the arm is engaged between the bracket and rear end of the foot 22 the back will be firmly braced and prevented from moving downwardly beyond the position shown in Figure 1 and also prevented from being broken. After the back has been lowered and the cushion of the rear seat turned to the position shown in Figure 1, blankets may be placed upon the two seats and lowered back of the front seat and a very comfortable bunk formed. When the back is to be again raised, it is drawn rearwardly and then tilted upwardly, after which it is thrust downwardly to engage the lower ends of its arms with the rods 15 of the brackets. The pins 16 are then turned to the position shown in Figure 2 and the bracket will be secured in the raised position. It will thus be seen that the front seat may be occupied in the usual manner when driving and when it is desired to sleep in an automobile the back of the front seat may be lowered in order to allow a comfortable bunk to be built.

Having thus described the invention, I claim:

1. A front seat for vehicles comprising a seat frame, a back, a mounting carried by said frame, an arm carried by said back and slidably engaged with said mounting for movement from an upright to a reclining position, means to brace said arm when in an upright position, means to brace said arm when in a reclining position, means to control sliding movement of said arm and secure the arm in an upright position, and a shield disposed above the mounting transversely thereof and open at its rear end, said arm extending into the open end of the shield whereby the arm will slide longitudinally through the shield when moved from an elevated to a reclining position.

2. A front seat for vehicles comprising a seat frame, a back, a mounting carried by said frame, an arm carried by said back and slidably engaged with said mounting for movement from an upright to a reclining position, an abutment in said mounting engageable by said arm to brace the arm when in an upright position, said arm being formed with a longitudinally extending slot having its lower portion reduced in width, and a rotatably mounted pin extending transversely through the mounting and slot of said arm to slidably and pivotally mount the arm, the pin being of greater diameter in one direction than the reduced portion of the slot and adapted to bear against walls of the slot above the upper end of the reduced portion thereof and secure the arm in an upright position with its lower end engaged with the abutment.

3. A front seat for vehicles comprising a seat frame, a back, a mounting carried by said frame, an arm carried by said back and slidably engaged with said mounting for movement from an upright to a reclining position, a rod extending transversely through said mounting and engageable by the inner end of said arm to brace the arm when in an upright position, said arm being U-shaped in cross section and having its side walls formed with longitudinally extending slots having their lower end portions reduced in width, and a pin rotatably carried by said mounting and extending through the slots of said arm to control sliding and tilting movements of the arm, the pin being of greater diameter in one direction than the reduced lower end portions of the slots and adapted to bear against walls of the slot to secure the arm in an upright position with its lower end engaged with said rod.

4. A front seat for vehicles comprising a seat frame, a back, a mounting carried by said frame, an arm carried by said back and slidably engaged with said mounting for movement from an upright to a reclining position, a rod extending transversely through said mounting and engageable by the inner end of said arm to brace the arm when in an upright position, said arm being U-shaped in cross section and having its side walls formed with longitudinally extending slots having their lower end portions reduced in width, a tongue extending longitudinally of said mounting between the walls of said arm and engageable by the arm to brace the arm when in a reclining position, and a pin rotatably carried by said mounting and extending through the slots of said arm to control sliding and tilting movements of the arm, the pin being of greater diameter in one direction than the reduced lower end portions of the slots and adapted to bear against walls of the slot to secure the arm in an upright position with its lower end engaged with said rod.

5. A front seat for vehicles comprising a seat frame, a back, a mounting carried by said frame, an arm carried by said back and slidably engaged with said mounting for movement from an upright to a reclining position, an abutment extending transversely through said mounting and engageable by the lower end of the arm to brace said arm against rearward tilting when in an upright position, means to control sliding movement of said arm and releasably secure the arm in upright position, and means carried by the mounting to overlap the arm and brace the arm from the front end thereof when the arm is in a reclining position.

6. A front seat for vehicles comprising a seat frame, a back, a mounting carried by said frame, an arm carried by said back and slidably engaged with said mounting for movement from an upright to a reclining position, an abutment extending transversely through said mounting and engageable by the lower end of the arm to brace said arm against rearward tilting when in an upright position, means to control sliding movement of said arm and releasably secure the arm in upright position, and means carried by the mounting to overlap the arm and brace the arm from the front end thereof when the arm is in a reclining position, said arm resting upon said abutment when in a reclining position and the means overlapping the front end of the arm when reclining being engaged with and braced by the securing means for the arm.

In testimony whereof I affix my signature.

ALBERT J. SWANSON. [L. S.]